Patented Dec. 1, 1931

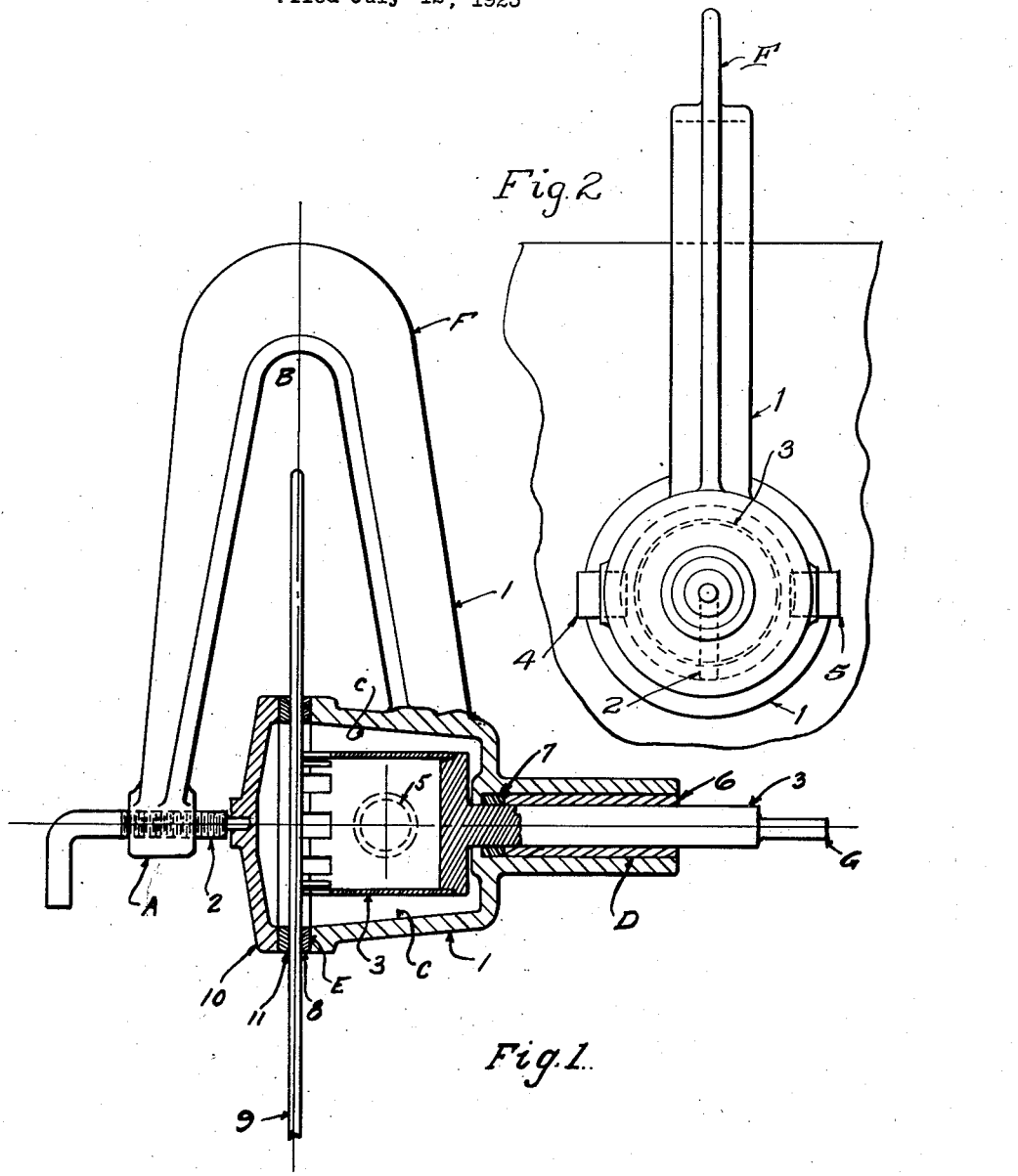

1,833,898

UNITED STATES PATENT OFFICE

EDWARD H. HANSEN, OF CHICAGO, ILLINOIS, ASSIGNOR, BY MESNE ASSIGNMENTS, TO JOHNSON FARE BOX COMPANY, OF CHICAGO, ILLINOIS, A CORPORATION OF NEW YORK

GLASS DRILLING MACHINE

Application filed July 12, 1923. Serial No. 651,027.

My invention relates to glass drilling machines of the portable type for use where a hole is required in glass already in place.

The objects of my invention are first, to provide a machine that is self-contained and light to handle, second to afford facilities for retaining the carborundum solution required in a tool of this kind, and third, to provide a suitable support for the glass to be drilled without removing said glass from its frame or other attached parts.

I attain these objects by the simple and inexpensive mechanism illustrated in the accompanying drawings, in which—

Figure 1 is a side elevation shown partly in section and Figure 2 is an end elevation. Similar numerals refer to similar parts in both views.

The casting 1 constitutes frame or body of the machine, and I prefer to have it incorporate the following features, a head as shown at "A" to provide support for the screw 2, yoke B designed to straddle the edge of a pane of glass enabling the operator to place the cutting tool 3 any where desired with respect to one face of said glass, a hollow chamber as at "C" to retain the grinding carborundum and water used in the drilling operation, inlet and outlet openings which can be plugged with common corks 4 and 5, respectively, a suitable extension as shown at "D" to retain renewable bearing 6 and felt packing 7, a face as shown at "E" to which is attached a rubber gasket 8, the rib as shown at "F" adds strength without excessive weight. The glass 9 is supported by the pressure plate 10 and rubber gasket 11 properly clamped in place by the screw 2. The actual cutting of the glass is accomplished as will readily be seen by anyone versed in the art, by rotating the standard cutting tool 3 by attaching an ordinary electric drill or hand brace at the outer end "G" of the cutter 3, maintaining a slight pressure against the glass 9.

It will be obvious to those skilled in the art that the invention is susceptible to various changes and modifications without departing from the spirit thereof, and, accordingly, it is not desired to limit the same to the particular construction or arrangement of parts herein illustrated, except where limitations appear in the appended claims.

I claim:

1. A device of the character described comprising a rotary tool having narrow radially disposed abrasive working faces, a cylindrical housing in which the tool is revoluble and being open at one end for projection of said radial faces, a support for holding said housing with its open side against the face of a work-piece, including a clamping plate held against the side of the said work-piece opposite from said housing, means for supplying a liquid abrasive to the working faces of the tool, a seal between both sides of the work-piece and the contiguous parts of the housing and said clamping part for preventing leakage of the liquid abrasive, and means for rotating the tool and feeding it axially.

2. A glass cutter comprising a support having a hollow head provided with an opening and having a clamping member adjacent the opening, said head being closed to confine an abradant when the cutter is in use, a cooperating clamping member, a yoke carried by one of said clamping members, and a hollow cutter rotatably mounted in said head.

3. A glass cutter comprising a support having a hollow head provided with an opening and having a clamping member adjacent the opening, a cooperating clamping member, a yoke carried by one of said clamping members, and a hollow cutter rotatably mounted in said head, the clamping member carried by the support having a cushion surface to form sealing contact with the glass.

4. A glass cutter comprising a support having a hollow head provided with an opening and having a clamping member adjacent the opening, a cooperating clamping member, a yoke carried by one of said clamping members, and a hollow cutter rotatably mounted in said head, the two clamping members having cushion glass-engaging surfaces.

5. A portable glass cutter comprising a body member having a hallow head closed to confine an abradant for glass cutting purposes when the tool is in use, a cutter rotatably mounted in said head, the head having a working opening for the cutter, and a yoke connected with the body member and having an opposing part spaced from the head and adapted to receive the glass edgewise for cutting purposes.

6. A portable glass cutter comprising a body member having a hollow head closed to confine an abradant for glass cutting purposes when the tool is in use, a cutter rotatably mounted in said head, the head having a working opening for the cutter, a yoke connected with the body member and adapted to receive the glass in edgewise relation, and means cooperating with the yoke for clamping the glass in place during the cutting act.

7. A device for cutting an annular hole through a glass windshield comprising a rotary, abrasive-working tool, a housing therefor, providing a holder for the abrasive material, means for supporting said housing on a windshield with the tool in operative relation thereto, and means for revolving the tool.

8. A device for cutting an annular hole through a glass windshield comprising a rotary, abrasive-working tool, a housing therefor, providing a holder for the abrasive material, means for supporting said housing on a windshield with the tool in operative relation thereto, means for revolving the tool, and means for preventing leakage of the abrasive material from both sides of the windshield.

9. A device for cutting an annular hole through a glass windshield comprising a rotary, abrasive-working tool, a housing therefor providing a holder for the abrasive material, and means for clamping said housing against one side of the windshield including a clamping plate on the side of the windshield opposite from the housing and overlying the area to be cut.

10. An abrading cutter comprising a rotary, abrasive-working tool, a housing therefor, a housing support for holding the tool in operative position on one side of a work-piece, said housing providing a liquid-abrasive holder, a seal between the housing and contiguous face of the work-piece for preventing leakage of the abrasive, and means for rotating the tool.

11. A device for cutting a hole through a work-piece of refractory material comprising a rotary abrasive-working tool, a holder therefor having parts adapted to be clamped on opposite sides of the work-piece, means for supplying a liquid abrasive to the working faces of the tool, resilient means interposed between said parts and each contiguous side of the work-piece circumscribing the area to be cut and providing a seal for preventing leakage of the abrasive from either side of the work-piece, and means for revolving the tool.

12. A device for cutting a hole through a plate of refractory material comprising a rotary abrasive-working tool, a housing therefor providing an abrasive holder, means adapted to be clamped against opposite sides of said plate for holding the tool in operative position and having rubber seats against said plate circumscribing the area to be cut, and means for revolving the tool.

13. A device for cutting an annular hole through a work-piece by an abrading action comprising a rotary tool having an abrasive-working face adapted for cutting a narrow annular slot, means for holding the tool in operative position at one side of the work-piece including a clamping plate at the side of the work-piece opposite from the rotary tool and overlying the area to be cut, means for supplying liquid abrasive to said tool, means for preventing leakage of said abrasive from either side of the work-piece, and means for revolving the tool.

14. A portable glass cutter for cutting circular openings in a sheet of glass, comprising an open ended housing adapted to bear against the sheet of glass being operated upon, a rotatable cutter mounted within the confines of said housing, a support mounted adjacent said housing and adapted to bear against the other side of the sheet of material being operated upon, a yoke connecting the housing and support and means for adjusting the support relative to the housing, substantially as described.

EDWARD H. HANSEN.